United States Patent [19]

Hager et al.

[11] 4,080,097
[45] Mar. 21, 1978

[54] LOCKING CONTROL AND OVERTRAVEL SAFETY STOP SYSTEM FOR VARIABLE LENGTH ROTOR BLADES

[75] Inventors: Lee N. Hager, Waterbury; Evan A. Fradenburgh, Fairfield; Jay M. Yarm, Milford, all of Conn.

[73] Assignee: United Technologies Corporation, Hartford, Conn.

[21] Appl. No.: 700,527

[22] Filed: Jun. 28, 1976

[51] Int. Cl.² .............................................. B64C 11/28
[52] U.S. Cl. ........................................ 416/87; 416/89
[58] Field of Search ................................... 416/87-89

[56] References Cited
U.S. PATENT DOCUMENTS

| 1,145,388 | 7/1915 | Rochon | 416/87 |
| 2,852,207 | 9/1958 | Jovanovich | 416/88 X |
| 3,768,923 | 10/1973 | Fradenburgh | 416/89 |
| 3,814,351 | 6/1974 | Bielawa | 416/87 X |
| 4,007,997 | 2/1977 | Yarm et al. | 416/89 |

Primary Examiner—Everette A. Powell, Jr.

[57] ABSTRACT

A locking control system and an overtravel safety top system are presented for a variable length rotor blade system. The lock system has linkage and pawl apparatus operated by a pilot actuated lock shaft to lock and unlock the blade adjustment system. A traveling nut on the lock shaft actuates the lock linkage, either directly or through the lock shaft to lock the blade adjustment system to prevent overretraction or overextension in the event of malfunction of the extension control system.

35 Claims, 2 Drawing Figures

LOCKING CONTROL AND OVERTRAVEL SAFETY STOP SYSTEM FOR VARIABLE LENGTH ROTOR BLADES

The invention herein described was made in the course of or under a contract or sub-contract thereunder, with the Department of the Army.

BACKGROUND OF THE INVENTION

1. Field of the Invention

The present invention relates to variable length blade systems and particularly to a variable-diameter telescoping aircraft rotor system. More specifically, this invention is directed to a control and locking system and an overtravel safety stop system for variable diameter rotor blade apparatus to prevent inadvertent diameter change and to prevent over-retraction or overextension of telescopic rotor blades of a helicopter. Accordingly, the general objects of the present invention are to provide novel and improved apparatus and methods of such character.

2. Description of the Prior Art

While not limited thereto in its utility, the present invention is particularly well suited for use on vertical takeoff aircraft such as helicopters. Variable diameter (i.e. variable length) helicopter rotors are known in the art. Examples of such variable diameter rotors may be found in U.S. Pat. Nos. 3,768,923 and 3,884,594, both issued to E. A. Fradenburgh and assigned to the assignee of the present invention. The full disclosures of U.S. Pat. Nos. 3,768,923 and 3,884,594 are incorporated herein by reference.

The prior art variable diameter rotor systems include an outer airfoil shaped blade which is caused to translate to telescope with respect to an inner blade portion or torque tube by jackscrew action. A traveling nut on the jackscrew is connected to the translatable blade so that the outer blade moves with the traveling nut. Clockwise or counterclockwise rotation is imparted to the jackscrew shafts via a differential gear arrangement located in the rotor head. The differential includes pinion gears coupled to each jackscrew shaft and upper and lower bevel gears which are coupled, via coaxial drive shafts, respectively to retraction and extension control brakes or clutches. When neither retraction or extension of the rotor blades is desired, the bevel gears of the differential and thus the coaxial shafts will all rotate about the rotor axis at the speed at which the rotor is being driven. Should it be desired to change the diameter of the rotor, one of the coaxial drive shafts will be braked thus producing a speed differential between the bevel gears and thereby imparting either clockwise or counterclockwise rotation to the differential pinion gears coupled to the blade jackscrews.

SUMMARY OF THE INVENTION

The control and locking system and overtravel safety system of the present invention allow the pilot to select blade length changes and prevents overretraction and overextension which might result either from inadvertence or from system malfunctions. The blade change system can be locked to prevent unintentional actuation thereof during steady state operation of the rotor or to terminate actuation thereof in the event of a system failure. In the preferred configuration disclosed herein, the blade length adjustment system is selectively locked by means of a locking pawl system and a lock shaft positioned coaxially within the extension and retraction shafts. The lock shaft can be selectively actuated by the pilot to either lock or unlock the blade diameter change system. This selective operation of the lock system by the pilot is accomplished through a hydraulic system which positions the lock shaft to position the locking pawls to either engage or disengage slots in a disc brake which forms part of the extension system. In the event of a malfunction of the control system, blade overtravel, either in the direction of extension or retraction, is prevented by an overtravel safety stop system which actuates the lock pawls. This safety stop system includes a traveling nut which moves along the lock shaft to either mechanically actuate the lock shaft to lock the pawls or to directly mechanically actuate the locking pawls depending on whether the control malfunction is in a direction to cause overretraction or overextension of the blades.

Accordingly, one object of the present invention is to provide a novel and improved control and locking system for a variable length blade system.

Another object of the present invention is to provide a novel and improved locking system for a variable length blade system whereby the blade adjustment system can be positively locked to prevent inadvertent actuation thereof.

Still another object of the present invention is to provide a novel and improved overtravel safety stop system for an adjustable length blade system whereby overtravel of the adjustable blade in either the extension or retraction directions is prevented in the event of a malfunction in the normal control system.

Other objects and advantages of the present invention will be apparent to and understood by those skilled in the art by the following detailed description and drawings.

BRIEF DESCRIPTION OF THE DRAWING

Referring now to the drawings, wherein like elements are numbered alike in the several figures.

DESCRIPTION OF THE PREFERRED EMBODIMENT

Figure 1:
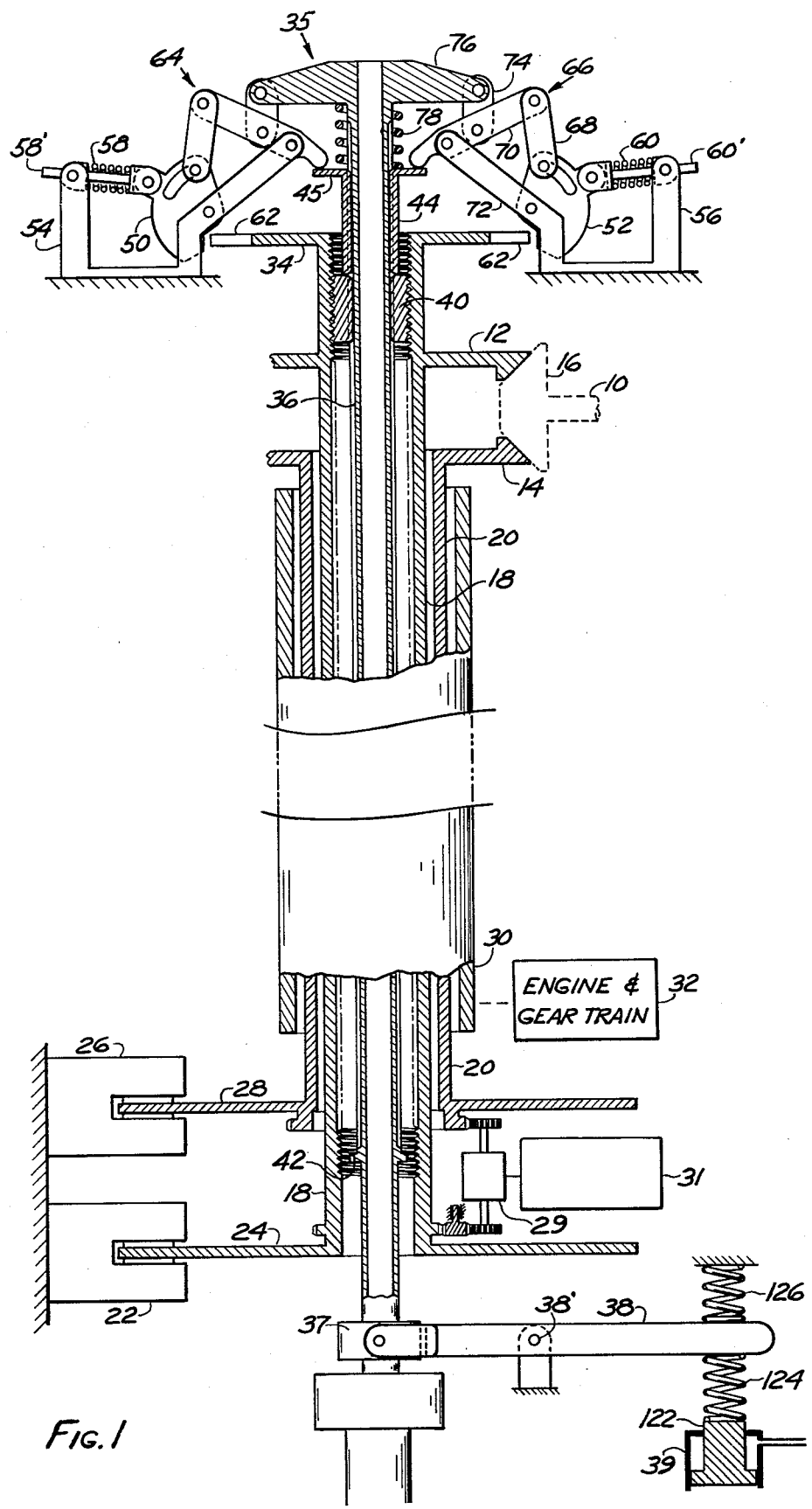
FIG. 1 is a sectional view, partly in schematic form, of the diameter lock system and overtravel safety stop system of the present invention.

Referring to FIG. 1, the apparatus for locking the blade length adjustment system to prevent inadvertent or unintended diameter changes during normal constant rotor diameter operation and the overtravel safety stop apparatus is shown in cross-section. In accordance with the prior art, as discussed above, the basic retraction and extension mechanism for each rotor blade is a jackscrew which serves as the primary tension member of each rotor blade. Rotation of the jackscrews, one of which is indicated schematically at 10, imparts a linear retraction or extension motion to the outboard half of the rotor blade (not shown), the outboard half of the blade being the main lifting member. The means for actuating the blade jackscrews, as shown in referenced U.S. Pat. Nos. 3,768,923 and 3,884,594, consists of a differential gear set contained within the rotor head. The differential consists of an upper bevel gear 12, a lower bevel gear 14 and one bevel pinion 16 connected to each of the blade jackscrews. The upper and lower bevel gears are respectively connected by coaxial rotatable shafts 18 and 20 to clutches or brakes 22 and 26 below the transmission. Shaft 18 is an extension shaft and shaft 20 is a retraction shaft for effecting movement of the blade. Brake 22 for upper bevel gear shaft 18 acts on a disc 24 extending outwardly from shaft 18. Similarly, brake 26 for lower bevel gear 14 acts on an outwardly extending disc 28 connected to shaft 20 at the bottom thereof. Actuating brake 26 to stop the rotation of retraction shaft 20 and the lower bevel gear 14 with respect to the shaft 18 and main shaft 30 (and the rotor head) while the rotor is turning, forces the pinions of the differential to roll around the bevel gear and thus turn the jackscrews and retract the blades. Actuating brake 22 to stop the rotation of extension shaft 18 and the upper bevel gear 12 reverses the motion of the pinions and jackscrews to extend the blades. With both of brakes 22 and 26 released, there is no relative motion and the rotor diameter remains fixed. Thus, the system is characterized by simplicity and reliability, and the rotor diameter change system is driven in both directions by rotation of the main shaft 30 on which the rotors are mounted. The main shaft 30 is, of course, driven by the engine through reduction gears; the engine and gear train being indicated generally at 32.

Since the rotor diameter is selected and controlled by the pilot, and thus is not influenced by aerodynamic forces or torques or mechanical limit stops, it is mandatory that the brakes 22 and 26 be released when the blades reach their normal limits of extension or retraction. In normal operation the brakes are released by means of a diameter control system having a miniature differential 29 and a miniature jackscrew and limit switch system 31 as shown in U.S. application Ser. No. 628,873 filed Nov. 5, 1975 by Yarm, and assigned to the assignee of the present invention, and is incorporated herein by reference.

In accordance with the present invention the blade diameter control system includes diameter lock apparatus which insures that the diameter change system is self-locking when the blade diameter has been adjusted to the degree selected by the pilot. Also in accordance with the present invention, a mechanical safety system is incorporated to prevent overretraction or overextension in case of a failure of the primary control mechanism.

Returning again to a discussion of the mechanism through which the pinion gears, such as gear 16, may be caused to rotate in either the clockwise or counterclockwise direction, it should again be noted that the outer shaft 20 of the two previously mentioned coaxial diameter-change shafts inside the main rotor shaft 30 forms part of the retraction apparatus, while shaft 18 within shaft 20 forms part of the extension apparatus. Because blade retraction requires larger mechanical forces than does blade extension, which is accomplished with the aid of centrifugal force, it is desirable to make the larger diameter outer shaft the retraction shaft. The extension shaft 18 extends upwardly past the upper bevel gear 12 and terminates in a rotor head friction brake disc 34. Disc 34 cooperates with stationary spring loaded calipers (not shown) to add a degree of friction to the system and thus regulate the overall mechanical efficiency of the retraction system. The jackscrews could have greater than 50% mechanical efficiency, thus making the jackscrews susceptible to possible inadvertent actuation from centrifugal forces. Disc 34 reduces the system efficiency to less than 50% to avoid that inadvertent actuation and thus make the blade adjusting system self-locking in this sense. Disc 34 also functions as part of a rotor diameter locking system. The structure and operation of the rotor head friction brake and diameter lock system will be discussed in greater detail below.

The diameter change system includes, in addition to the differential gear assembly in the rotor head, the coaxial retraction and extension shafts 20 and 18, the brakes 22 and 26 and the rotor head friction brake, a mechanical lock device 35 and a third shaft 36. Shaft 36 is a lock shaft, which is concentric with and disposed inwardly of extension shaft 18. As previously noted, the retraction and extension shafts are respectively connected to input bevel gears of the differential and extend down from the differential assembly through the main rotor shaft; the retraction and extension shafts terminating in brake discs. The extension and retraction shafts are supported at their upper ends by their respective bevel gear bearings, the bearings having been eliminated from the drawing in the interest of facilitating understanding of the invention. The third and innermost shaft 36 is constrained to rotate with the rotor head and main shaft 30. Shaft 36 is capable of a limited degree of vertical movement and functions, in the manner to be described below, to provide the normal mechanical means of operating the blade diameter lock mechanism. Also, by virtue of its ability to move vertically, shaft 36 is employed to operate the mechanical blade overtravel safety limit stop. Finally, shaft 36 is hollow and thus provides a conduit for hydraulic lines and electrical instrumentation wires. The lower end of shaft 36 is provided with both hydraulic and electrical slip rings. The means for actuating shaft 36 for vertical movement includes a connecting linkage 38 which is connected through bearing 37 to shaft 36.

One of the two principal features of the present invention is the provision of a locking system selectively operable by the pilot to lock the blade adjustment system against either extension or retraction during normal operation of the rotor. The lock system includes lock shaft 36 and the lock linkage mechanism 35 at the top of the rotor which is operated by shaft 36 to lock or release brake 34. Downward movement of shaft 36 will actuate linkage system 35 to lock brake 34 and hence lock the blade adjustment mechanism, while upward movement of shaft 36 will release the lock mechanism to permit rotation of brake disc 34 and hence permit blade adjustment. The pilot selectively operates a lock actuating hydraulic cylinder and piston 39 to pivot link 38 about its pivot point 38', whereby shaft 36 is moved down or up to lock or unlock the blade adjustment system as desired.

As noted above, the other of the principal features of the present invention is the provision of an overtravel safety locking system which will prevent blade overtravel if the normal control system fails to function properly. The overtravel safety stop system includes a traveling nut 40 which is threaded exteriorly and engages an interior thread on extension shaft 18; this thread typically being a right-hand double thread. The interior of traveling nut 40 is connected to the exterior of shaft 36 by means of a spline type connection. During constant rotor diameter operation there is no relative motion between any of the three coaxial shafts and thus there will be no vertical movement of nut 40. However, during a diameter change, a relative rotation will occur between shaft 18 and shaft 36. The traveling nut 40 is constrained by the spline on shaft 36 to rotate with shaft 36 and, because of the threaded interface with extension shaft 18, nut 40 is also constrained to translate axially. The direction of travel of nut 40 is dependent on whether the rotor diameter is increasing or decreasing. Thus, a rotor diameter increase causes the nut to travel upward while a diameter decrease results in nut 40 traveling downwardly. Before the rotor blades encounter physical limits to diameter change, the nut 40 will reach limits, in the form of mechanical stops, built into the diameter change mechanism. Thus, during a blade retraction nut 40 translating downwardly will directly contact a shoulder 42 near the bottom of the shaft 36. Continued relative rotation between the retraction shaft 18 and shafts 20 and 36, after nut 40 contacts shoulder 42, will result in shaft 36 being forced downwardly thus actuating lock linkage mechanism 35 to engage, in the manner to be more fully described below, the lock system. Conversely, during a blade extension overtravel, the nut 40 will reach the top of the rotor head and contact a flanged sleeve 44 which is loose splined to shaft 36 to move sleeve 44 upward. As shown in FIG. 1, nut 40 has contacted the sleeve 44 and moved sleeve 44 upward to initiate the lock mechanism. The system of springs and mechanical linkages in the rotor head constituting lock mechanism 35 will, in the manner to be described below, also be operated by the upward movement of sleeve 44 to drive shaft 36 downwardly to cause engagement of the blade diameter lock system.

The diameter lock mechanism, as previously mentioned, is mounted on top of the rotor head and consists of a pair of locking pawls 50 and 52. Pawls 50 and 52 are respectively mounted from support brackets 54 and 56 by means of pivotal connecting linkages 58' and 60' and over center springs 58 and 60. Brackets 54 and 56 are mounted on the helicopter rotor head. The friction brake disc 34 is common to both the diameter lock system and the rotor head friction brake. Brake disc 34 is provided, about its periphery, with slots, such as indicated at 62, which meet with the locking pawls 50 and 52 to prevent relative motion between the rotor head and the diameter change differential mechanism. Thus, with pawls 50 and 52 engaged in the slots 62 in disc 34, the rotor diameter is mechanically locked at a constant value. In one embodiment of the invention, there are six equally spaced slots 62 and the disc 34 is provided with "accelerating ramps" so as to allow the pawls to have appreciable radial velocity when proper alignment with slots 62 occurs. The pawls 50 and 52 are operated between their retracted position as shown and engagement with the slot 62 in disc 34 by means of a system of linkages as indicated generally at 64 for pawl 50 and at 66 for pawl 52. Considering the diameter locking assembly linkage 66 only (linkages 66 and 64 being identical), a pawl connecting linkage 68 moves in a slot in pawl 52 and is operated by an actuating arm 70; arm 70 being pivotally supported at the end of an extension 72 of bracket 56. Actuating arm 70 is coupled, via an actuating arm connecting link 74 to a shaft crossbeam 76 which extends outwardly from the upper end of shaft 36. A spring 78 is interposed between the base of crossbeam 76 and the upper end of sleeve 44. As previously noted, the diameter locking assembly is shown in FIG. 1 in the unlocked position. During normal operation, wherein the assembly including pawls 50 and 52 function to lock the rotor diameter at a desired position, the lock pawls 50 and 52 are operated by vertical motion of shaft 36 through the linkages 64 and 66. Raising shaft 36 fully, upon signal from the pilot, releases the pawls from engagement with the slots 62 in friction brake disc 34 and places the pawls in an eight degree over center position where they stay during diameter change operations. When it is desired to reengage the lock system, shaft 36 will be lowered, in the manner to be described below, bringing the pawls 50 and 52 back into contact with disc 34, with the pawls again being in over center. Usually, when locking is desired, the slots 62 will be out of alignment with the pawls and shaft 36 will not move to the full down position. However, with a momentary diameter change command from the pilot, the desired alignment will take place and the pawls will snap into place by action of the over center springs 58 and 60 and the circular arc slots in the pawls as engaged by the pawl connecting links such as link 68. When the pawls snap into the slots in the brake disc 34 the shaft 36 will translate to the full down position in the manner to be described.

It will be noted that either upward or downward movement or shaft 36 is transmitted through links 74 to pivot links 70 about the ends of extensions 72, thus causing the ends of links 68 to ride in the slots in pawls 52. A pin on the end of each link 68 will pivot pawls 50 and 52 either clockwise or counterclockwise when the pins engage the ends of the pawl slots to drive the pawls to locked or unlocked over center positions.

In the event that the normal control system for blade adjustment should malfunction, the present invention provides a mechanical safety system to prevent overtravel, either by way of overextension or overretraction, of the rotor blades. This safety stop system includes both a mechanism to actuate the locking pawls of the lock system as well as a feature for deactivating extension and retraction brakes or clutches 22 and 26 by terminating the flow of hydraulic fluid to the brakes.

During constant rotor diameter operation, there is no relative motion between coaxial shafts 20, 18 and 36. However, there is relative rotation between these three shafts whenever a diameter change of the blade is occurring. Traveling nut 40 is constrained by its splined connection with lock shaft 36 to rotate with lock shaft 36; and, because of the threaded interface between traveling nut 40 and extension shaft 18, traveling nut 40 is caused to translate axially in the space between shafts 18 and 36 when there is relative rotational movement between the two shafts, with the direction of motion of traveling nut 40 being dependent on whether rotor diameter is increasing or decreasing. With the internal thread on extension shaft 18 being the double thread, right-handed, previously described, an increase in rotor diameter causes traveling nut 40 to travel upwardly toward lock mechanism 35 and a decrease in blade diameter results in traveling nut 40 traveling downward toward bearing 37. During normal operation of the diameter changing mechanism, traveling nut 40 will move up and down within a range of travel depending on the direction and amount of diameter change being effected. However in the event that the diameter change control system fails, traveling nut 40 will encounter limit stops to actuate lock mechanism 35 before the overtravel of the rotor blades takes place.

Traveling nut 40 is shown in FIG. 1 near the top limit of its travel. In the event that the control system were to fail and the rotor blades were to move in a diameter decreasing direction, traveling nut 40 would move downward relative to shafts 18 and 36 commensurate with the diameter change taking place. With no control system to regulate the diameter reduction, traveling nut 40 will eventually contact shoulder 42 on shaft 36, and any further reduction in the diameter of the blades will result in further downward movement of traveling nut 40 which will then move shaft 36 downward at the same time. The downward motion of shaft 36 will, as previously described, pull crossbeam 76 downward to actuate linkages 64 and 66 to drive the pawls 50 and 52 to the locked position in engagement with slots 62 in disc brake 34. Thus, any malfunction which would tend to create an overtravel of the blade change mechanism in the diameter decreasing direction will cause the locking mechanism to be activated to terminate diameter change before an overtravel occurs.

If, on the other hand, the blades should move in a diameter increasing direction upon failure of the regular control system, traveling nut 40 will move upward until it contacts sleeve 44, and traveling nut 40 will then drive sleeve 44 upward against spring 78. The upward movement of sleeve 44 will bring the flanged end 45 of sleeve 44 into contact with the free ends of links 70 which will cause each of the links 70 to be pivoted in a direction to move the pawls 50 and 52 to engage slots 62 in brake 34 to actuate the lock mechanism. Again bearing in mind that no diameter change can occur when the pawls 50 and 52 are in locking engagement with disc 34, it can again be seen that a malfunction of the regular control system results in locking of the diameter change mechanism before any overtravel in the diameter increasing direction can occur. It is important to note that the upward movement of sleeve 44 and the actuation of linkages 64 and 66 actually results in crossbeam 76 and lock shaft 36 being moved downwardly when the linkages are activated by the upward movement of sleeve 44. Thus, locking of the diameter change system in the safety mode results in downward movement of lock shaft 36 regardless of whether the safety operation is triggered by a diameter change in either the diameter decreasing direction or the diameter increasing direction. This fact is of significance in that the downward movement of lock shaft 36 is also used to cut off the supply of hydraulic pressurized fluid to brakes 22 and 26.

It should be noted that during operation of the overtravel safety stop system, brake disc 34 may be rotating at its full rpm relative to the rotor head. To allow the locking pawls to engage under these conditions, the entrance portions to each slot 62 on the periphery of disc 34 are gently curved to form accelerating ramps to allow the pawls 50 and 52 to build up radial velocity as they come into full alignment with and fully snap into slots 60 and 62. The over center springs 58 and 60 are stiff enough, and the pawls are light enough to permit the pawls to engage the slots in disc 34 even at full relative rpm of disc 34. The angular momentum of the entire retraction system is quite small so that there is no shock load problem.

Once the overtravel safety stop system has caused the lock to become engaged, subsequent disengagement in flignt is not possible in the embodiment disclosed. Disengagement becomes a ground maintenance matter. Disengagement in flight would require either an upward movement of locking shaft 36 by pilot initiated operation of lever 38, which cannot occur because of the malfunction in the control system, or rotation of extension shaft 18 which cannot occur because brake 34 is locked. If the blades become locked at minimum rotor diameter by the safety stop system, a fixed wing type landing of the vehicle is required, the vehicle being designed to be capable of fixed wing operation. Conversely, if the blades become locked at maximum diameter, then the vehicle can continue operation in normal helicopter modes. Of course, it will be recognized that an in flight actuation to disengage the lock of the safety stop system could be provided if desired.

Figure 2:
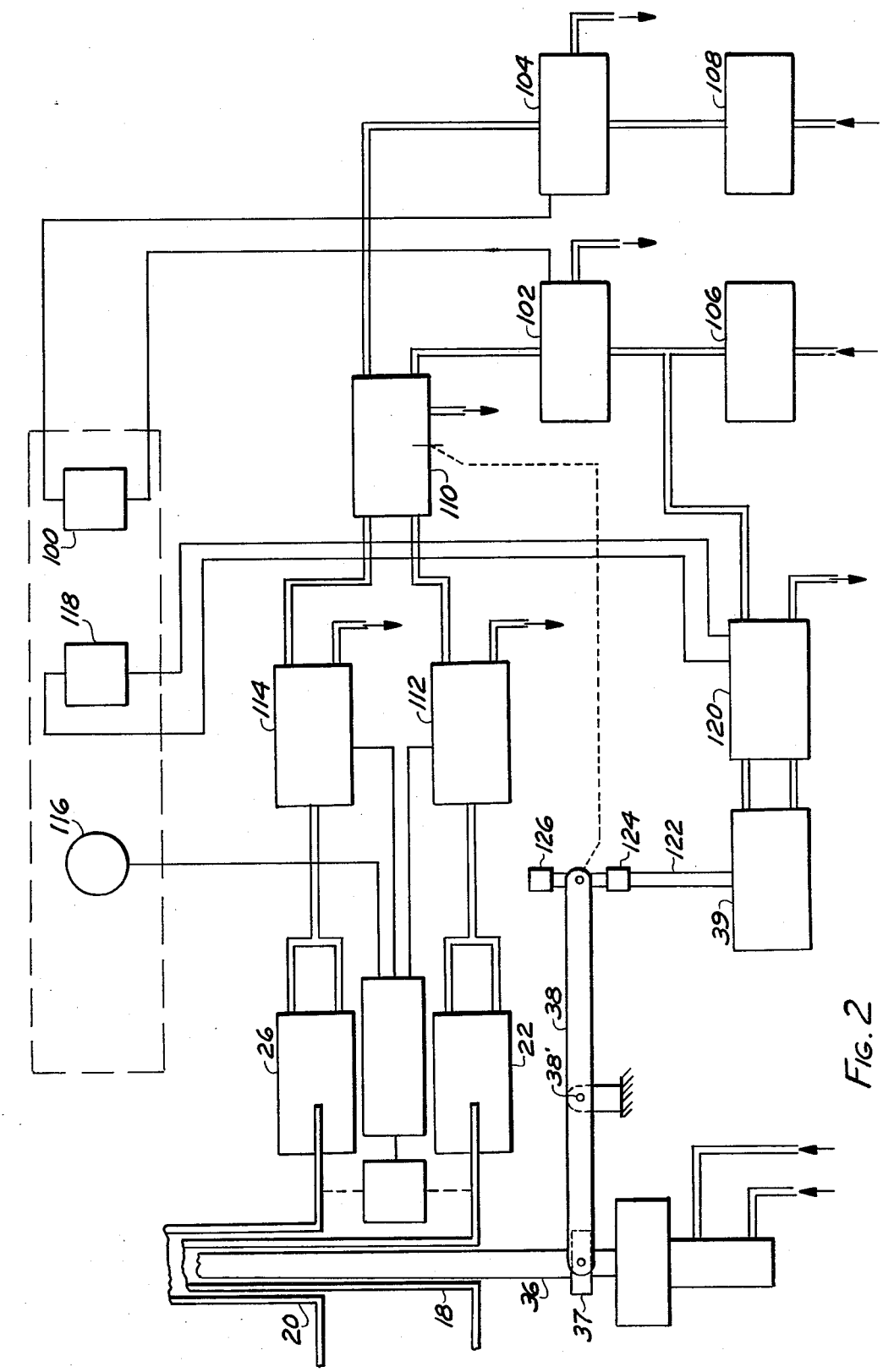
FIG. 2 is a schematic of the control system for the present invention.

Referring now to FIG. 2, a hydraulic and electrical schematic of the diameter lock system and overtravel safety stop system is shown. A three position electrical switch 100 in the cockpit is operated by the pilot to adjust blade diameter for either extension or retraction. Switch 100 is a known type of switch having a self-centering neutral or stop position which corresponds to constant diameter blade operation. The pilot moves the switch to one extreme or the other for either extension or retraction. Movement of switch 100 to the extension or retraction position will result in actuating either solenoid valve 102 or 104 to deliver hydraulic fluid through pressure regulator 106 or 108 and through the activated solenoid valve to a bypass valve 110 and thence to either extension bypass solenoid valve 112 or retraction bypass solenoid valve 114. During normal diameter control operation the hydraulic fluid delivered to either valve 112 or 114 will, in turn, be delivered to clutch 22 or clutch 26 to operate the clutches to effect the desired blade length change. The adjusted blade diameter is sensed by miniature differential 29 and miniature jackscrew and limit switch mechanism 31 and is displayed on rotor diameter indicator 116 in the cockpit. The limit switches in mechanism 31 also function to actuate the retraction and extension bypass solenoid valves 112 and 114 to cut off the delivery of hydraulic fluid to the respective clutches when the normal limit of blade extension or blade retraction has been reached. Thus, the normal operation of the control system permits the pilot to select blade extension or retraction and provides for automatic termination of extension or retraction in the event that the normal limits of extension or retraction are reached.

A pilot operated electrical lock switch 118 is also located in the cockpit to permit the pilot to lock the blade diameter adjustment mechanism during constant diameter operation. By closing lock switch 118, an electrical circuit is completed which results in the actuation of lock control solenoid valve 120. When valve 120 is actuated, pressurized hydraulic fluid is delivered through valve 120 to lock actuating cylinder 39 to drive the piston in cylinder 39 upward. The upward movement of the piston drives piston rod 122 upward to pivot actuating arm 38 counterclockwise and thus pull lock rod 36 down to engage the pawls in disc 34. As previously noted, pawls 50 and 52 may not be in correct alignment to permit engagement at any given time, and hence shaft 36 will not be able to move to its full down position. A momentary diameter change command from the pilot will effect the desired lock alignment and permit the locking pawls to snap into place by action of the over center springs 58 and 60. An override spring 124 in series with rod 122 permits the piston of lock actuating cylinder 39 to move to its fully traveled upper position even when shaft 36 has not yet moved fully downward so that a lock command can be fully executed through the hydraulic control system and will be fully carried out when the pawls and disc slots are in alignment. The pilot can deactivate the lock system by opening switch 118 to change the position of lock solenoid control valve 120 to drive the piston and lock cylinder 39 downward, thus pivoting actuating arm 38 clockwise to raise lock shaft 36. The end of actuating arm 38 is mechanically connected to bypass valve 110, and the counterclockwise actuation of arm 38 operates bypass valve 110 to terminate the delivery of pressurized fluid to either of solenoids 112 and 114 and clutches 22 and 26. Accordingly, upon actuation of bypass valve 110 to cause return of the hydraulic fluid to its source, the clutches 22 and 26 are deactivated by termination of the delivery of any pressurized hydraulic fluid thereto. Thus, operation of the lock mechanism also insures that the clutches are deactivated so that there will be no signal in the system calling for a rotor diameter change when the blades are locked against diameter change.

In the event of failure of the normal control system, lock shaft 36 will, as previously described, be driven downward in the event of an overtravel in either the extension or retraction directions. The downward motion of shaft 36 will cause counterclockwise rotation of actuating arm 38 which is permitted by the expansion of override spring 124 and the compression of the second override spring 126. Since, as previously described, the end of actuating arm 38 is mechanically connected to bypass valve 110, the counterclockwise actuation of arm 38 operates bypass valve 110 to terminate the delivery of pressurized fluid to either of solenoids 112 and 114 and clutches 22 and 26. Accordingly, upon actuation of bypass valve 110 to cause return of the hydraulic fluid to its source, the clutches 22 and 26 are deactivated by termination of the delivery of any pressurized hydraulic fluid thereto. Thus, operation of the overtravel safety stop system not only actuates the lock mechanism, but it also insures that the clutches are deactivated so that there will be no signal in the system calling for a rotor diameter change when the blades are locked against diameter change.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A locking system for variable length rotor blades of a rotor assembly, the rotor blades being mounted on a rotatable main rotor shaft and being adjustable in length upon actuation of adjusting means for changing the length of the rotor blades, the locking system including:
   a rotatable extension shaft coaxial with said main rotor shaft and coupled to said adjusting means;
   a rotatable retraction shaft coaxial with said main rotor shaft and coupled to said adjusting means;
   a lock shaft coaxial with said extension and retraction shafts, said lock shaft being rotatable with the main rotor shaft and translatable with respect to the main rotor shaft;
   lock means mounted on said rotor assembly for locking engagement with a part of one of said extension or retraction shafts, said lock means including pawls movable between a locked position in locking engagement with part of said one shaft and an unlocked position disengaged from said part;
   connecting means between said lock shaft and said lock means for operating said lock means in response to translation of said lock shaft to a clocking position; and
   actuating means for selectively translating said lock shaft.

2. A locking system as in claim 1 wherein:
   said adjusting means includes differential means having first and second differential gears and pinion gears; and
   said extension shaft is coupled to said first differential gear and said retraction gear is coupled to said second differential gear.

3. A locking system as in claim 2 including:
   disc means on said one shaft having a plurality of slots therein, said pawls having a first position out of engagement with said slots and a second position in engagement with said slots.

4. A locking system as in claim 3 wherein:
   said disc means is part of brake means for resisting rotation of said one shaft.

5. A locking system as in claim 3 wherein said lock means includes:
   linkage means between said lock shaft and said pawls; and
   over center spring means to hold said pawls in said locked or unlocked position.

6. A locking system as in claim 3 including:
   traveling nut means between said lock shaft and said one shaft for translational movement along said lock shaft commensurate with length adjustments of said rotor blades as a function of relative rotation between said lock shaft and said one shaft;
   first overtravel means for engagement by said traveling nut means in one direction of travel thereof to actuate said lock means to prevent overtravel of said rotor blades in a first direction; and
   second overtravel means for engagement by said traveling nut means in another direction of travel thereof to actuate said lock means to prevent overtravel of said rotor blades in a second direction.

7. A locking system as in claim 6 wherein said first overtravel means includes:
   movable means along said lock shaft, said movable means being movable by said traveling nut means to engage said lock means to actuate said pawls to the locked position thereof.

8. A locking system as in claim 7 wherein:
   said movable means is a sleeve about said lock shaft, said sleeve having a flange to contact said lock means.

9. A locking system as in claim 6 wherein said second overtravel means includes:
   contact means on said lock shaft for engagement by said traveling nut means to translate said lock shaft to actuate said pawls to the locked position thereof.

10. A locking system as in claim 6 wherein:
    said lock shaft translates in one direction upon engagement of either said first or second overtravel means by said traveling nut means.

11. A locking system as in claim 10 wherein said second overtravel means includes:
    contact means on said lock shaft for engagement by said traveling nut means to translate said lock shaft to actuate said pawls to the locked position thereof and translate said lock shaft in said one direction.

12. A locking system as in claim 10 wherein said first overtravel means includes:
    movable means along said lock shaft, said movable means being movable by said traveling nut means to engage said lock means to actuate said pawls to the locked position thereof and translate said lock shaft in said one direction.

13. A locking system as in claim 12 wherein:

said movable means is a sleeve about said lock shaft, said sleeve having a flange to contact said lock means.

14. A locking system for variable length rotor blades of a rotor assembly, the rotor blades being mounted on a rotatable main rotor shaft and being adjustable in length upon actuation of adjusting means to change the length of the rotor blades, the locking system including:

a rotatable extension shaft coaxial with said main rotor shaft and coupled to said adjusting means;

a rotatable retraction shaft coaxial with said main rotor shaft and coupled to said adjusting means;

a lock shaft coaxial with said extension and retraction shafts, said lock shaft being rotatable with the main rotor shaft and translatable with respect to the main rotor shaft;

lock means mounted on said rotor assembly for locking engagement with a part of one of said extension or retraction shafts;

connecting means between said lock shaft and said lock means for operating said lock means in response to translation of said lock shaft to a locking position;

actuating means for selectively translating said lock shaft rotation control means for controlling said extension and retraction shafts to establish relative rotation therebetween; and shutoff means operably connected to said lock shaft to deactivate said rotation control means upon translation of said locking shaft to the locking position thereof.

15. A locking system as in claim 14 wherein:

said adjusting means includes differential means having first and second differential gears and pinion gears; and said extension shaft is coupled to said first differential gear and said retraction gear is coupled to said second differential gear.

16. A locking system as in claim 15 wherein said rotation control means includes hydraulically operated brakes on each of said extension and retraction shafts, and wherein:

said shutoff means includes valve means operable by said lock shaft to terminate the delivery of pressurized hydraulic fluid to said brakes.

17. A locking system as in claim 15 including:

disc means on said one shaft having a plurality of slots therein; and wherein said lock means includes pawls movable between a locked position in engagement with said slots and an unlocked position disengaged from said slots.

18. A locking system as in claim 15 including:

traveling nut means between said lock shaft and said one shaft for translational movement along said lock shaft commensurate with length adjustments of said rotor blades as a function of relative rotation between said lock shaft and said one shaft;

first overtravel means for engagement by said traveling nut means in one direction of travel thereof to actuate said lock means to prevent overtravel of said rotor blades in a first direction; and second overtravel means for engagement by said traveling nut means in another direction of travel thereof to actuate said lock means to prevent overtravel of said rotor blades in a second direction.

19. A locking system as in claim 18 wherein said second overtravel means includes:

contact means on said lock shaft for engagement by said traveling nut means to translate said lock shaft to actuate said pawls to the locked position thereof.

20. A locking system as in claim 18 wherein:

said lock shaft translates in one direction upon engagement of either said first or second overtravel means by said traveling nut means.

21. A locking system as in claim 18 wherein said first overtravel means includes:

movable means along said lock shaft, said movable means being movable by said traveling nut means to engage said lock means to actuate said pawls to the lock position thereof.

22. A locking system as in claim 21 wherein:

said movable means is a sleeve about said lock shaft, said sleeve having a flange to contact said lock means.

23. An overtravel safety stop system for variable length rotor blades, the rotor blades being mounted on a rotatable main rotor shaft and being adjustable in length upon actuation of adjusting means to change the length of the rotor blades, the safety stop system including:

a rotatable extension shaft coaxial with said main rotor shaft and coupled to said adjusting means;

a rotatable retraction shaft coaxial with said main rotor shaft and coupled to said adjusting means;

a lock shaft coaxial with said extension and retraction shafts said lock shaft being rotatable translatable;

lock means mounted on said rotor assembly for locking engagement with a part of one of said extension or retraction shafts;

connecting means between said lock shaft and said lock means for actuating said lock means in response to translation of said lock shaft to a clocking position;

traveling nut means between said lock shaft and said one shaft for translational movement along said lock shaft commensurate with length adjustments of said rotor blades as a function of relative rotation between said lock shaft and said one shaft;

first overtravel means for engagement by said traveling nut means in one direction of travel thereof to actuate said lock means to prevent overtravel of said rotor blades in a first direction; and second overtravel means for engagement by said traveling nut means in another direction of travel thereof to actuate said lock means to prevent overtravel of said rotor blades in a second direction.

24. A locking system as in claim 23 wherein:

said adjusting means includes differential means having first and second differential gears and pinion gears; and said extension shaft is coupled to said first differential gear and said retraction gear is coupled to said second differential gear.

25. An overtravel safety stop system as in claim 24 wherein said second overtravel means includes:

contact means on said lock shaft for engagement by said traveling nut means to translate said lock shaft to actuate said pawls to the locked position thereof.

26. An overtravel safety stop system as in claim 24 wherein:

said lock shaft translates in one direction upon engagement of either said first or second overtravel means by said traveling nut means.

27. An overtravel safety stop system as in claim 26 wherein said second overtravel means includes:

contact means on said lock shaft for engagement by said traveling nut means to translate said lock shaft to actuate said pawls to the locked position thereof and translate said lock shaft in said one direction.

28. An overtravel safety stop system as in claim 26 wherein said first overtravel means includes:
movable means along said lock shaft, said movable means being movable by said traveling nut means to engage said lock means to actuate said pawls to the locked position thereof and translate said lock shaft in said one direction.

29. An overtravel safety stop system as in claim 28 wherein:
said movable means is a sleeve about said lock shaft, said sleeve having a flange to contact said lock means.

30. An overtravel safety stop system as in claim 24 wherein said first overtravel means includes:
movable means along said lock shaft, said movable means being movable by said traveling nut means to engage said lock means to actuate said pawls to the locked position thereof.

31. An overtravel safety stop system as in claim 30 wherein:
said movable means is a sleeve about said lock shaft, said sleeve having a flange to contact said lock means.

32. An overtravel safety stop system as in claim 30 including:
actuating means for selectively translating said lock shaft.

33. An overtravel safety stop system as in claim 30 including:
rotation control means for controlling said extension and retraction shafts to establish relative rotation therebetween; and
shutoff means operably connected to said lock shaft to deactivate said rotation control means upon translation of said lock shaft to the locking position thereof.

34. An overtravel safety stop system as in claim 33 wherein said rotation control means includes hydraulically operated brakes on each of said extension and retraction shafts; and wherein
said shutoff means includes valve means operable by said lock shaft to terminate the delivery of pressurized hydraulic fluid to said brakes.

35. An overtravel safety stop system as in claim 33 including:
disc means on said one shaft having a plurality of slots therein; and wherein
said lock means includes pawls movable between a locked position in engagement with said slots and an unlocked position disengaged from said slots.

* * * * *

UNITED STATES PATENT AND TRADEMARK OFFICE
CERTIFICATE OF CORRECTION

PATENT NO. : 4,080,097
DATED : March 21, 1978
INVENTOR(S) : L. Hager et al

It is certified that error appears in the above-identified patent and that said Letters Patent are hereby corrected as shown below:

ABSTRACT, line 1, change "top" to --stop--

Column 2, line 40, after "sectional" insert --elevation--

Column 7, line 58, change "flignt" to --flight--

Claim 1, line 23, (Column 9, line 64) change "clocking" to --locking--

Claim 23, line 12 (Column 12, line 29) after "rotatable" insert --and--

Claim 23, line 18 (Column 12, line 35) change "clocking" to --locking--

Signed and Sealed this

First Day of August 1978

[SEAL]

Attest:

RUTH C. MASON
Attesting Officer

DONALD W. BANNER
Commissioner of Patents and Trademarks